(12) United States Patent
Espenschied

(10) Patent No.: US 9,422,023 B1
(45) Date of Patent: Aug. 23, 2016

(54) BICYCLE FOR RIDING AND WALKING

(71) Applicant: Steven Aloysius Espenschied, Huntington Beach, CA (US)

(72) Inventor: Steven Aloysius Espenschied, Huntington Beach, CA (US)

( * ) Notice: Subject to any disclaimer, the term of this patent is extended or adjusted under 35 U.S.C. 154(b) by 0 days.

(21) Appl. No.: 14/820,501

(22) Filed: Aug. 6, 2015

(51) Int. Cl.
*B62K 19/00* (2006.01)
*B62K 3/02* (2006.01)
*B62K 3/00* (2006.01)

(52) U.S. Cl.
CPC ............... *B62K 19/00* (2013.01); *B62K 3/002* (2013.01); *B62K 3/02* (2013.01)

(58) Field of Classification Search
CPC ........... B62K 19/00; B62K 3/002; B62K 3/02
USPC ........................................ 280/288.2
See application file for complete search history.

(56) References Cited

U.S. PATENT DOCUMENTS

| | | | | | |
|---|---|---|---|---|---|
| 4,342,465 | A * | 8/1982 | Stillings | ............... | A61H 3/04 135/67 |
| 4,375,294 | A * | 3/1983 | Beauchamp | ........... | B62K 17/00 280/87.021 |
| 4,619,462 | A * | 10/1986 | Shaffer | ............... | A61G 5/02 188/24.11 |
| 4,621,804 | A * | 11/1986 | Mueller | ............... | A47D 13/043 135/67 |
| 4,798,395 | A * | 1/1989 | Shaffer | ............... | A61G 5/023 280/240 |
| 4,813,664 | A * | 3/1989 | Vroulis | ............... | A61H 3/04 280/87.021 |
| 5,328,193 | A * | 7/1994 | Shiew | ............... | B62K 3/002 280/62 |
| 5,351,700 | A * | 10/1994 | Jones, III | ............... | A61H 3/04 135/67 |
| 5,378,215 | A * | 1/1995 | Harkins | ............... | A61H 3/04 135/67 |
| 5,526,893 | A * | 6/1996 | Higer | ............... | A61H 3/04 180/65.1 |
| 5,741,020 | A * | 4/1998 | Harroun | ............... | A47D 13/04 280/42 |
| 6,299,189 | B1 * | 10/2001 | Chao | ............... | B62K 3/002 280/220 |
| 6,540,648 | B1 * | 4/2003 | Chao | ............... | B62M 1/28 280/220 |
| 6,595,530 | B2 * | 7/2003 | Wood | ............... | A61H 3/04 280/42 |
| 7,017,685 | B2 * | 3/2006 | Schoenberg | ............ | B60K 1/04 180/2.1 |
| 7,341,543 | B2 * | 3/2008 | Dandy | ............... | A63B 22/20 280/271 |
| 7,422,550 | B1 * | 9/2008 | Pinero | ............... | A61H 3/008 135/65 |
| 7,568,712 | B2 * | 8/2009 | Kovachi | ............... | A61H 3/008 280/23.1 |
| 7,900,940 | B1 * | 3/2011 | Vidmar | ............... | A61H 3/008 280/271 |
| 8,573,612 | B1 * | 11/2013 | Fulk | ............... | A61H 3/04 135/67 |
| 8,663,133 | B2 * | 3/2014 | Johnson | ............... | A61F 5/24 482/78 |
| 2003/0228959 | A1 * | 12/2003 | Perlstein | ............... | A61H 3/04 482/74 |
| 2004/0063550 | A1 * | 4/2004 | Harris | ............... | A61H 3/008 482/69 |
| 2006/0071443 | A1 * | 4/2006 | Perlstein | ............... | A61H 3/04 280/282 |
| 2013/0299251 | A1 * | 11/2013 | Wilson | ............... | B60L 7/24 180/2.2 |
| 2014/0026893 | A1 * | 1/2014 | Johnson | ............... | A61H 3/008 128/845 |

\* cited by examiner

*Primary Examiner* — Joseph Rocca
*Assistant Examiner* — Michael Stabley
(74) *Attorney, Agent, or Firm* — Aaron P. McGushion

(57) ABSTRACT

The present bicycle enables a user to selectively ride or walk the bicycle by providing a clearance or enclosure between the front portion of the bicycle and the rear portion of the bicycle. The enclosure is created by bending two top tubes laterally outward and away from each other, and bending two down tubes laterally outward and away from each other, so that the user can stand or walk within the enclosure, with his body between the two top tubes and between the two down tubes. The space provided by the enclosure is sufficient to permit pedaling while seated and permit walking while standing, without excessive bumping into the bicycle frame.

10 Claims, 3 Drawing Sheets

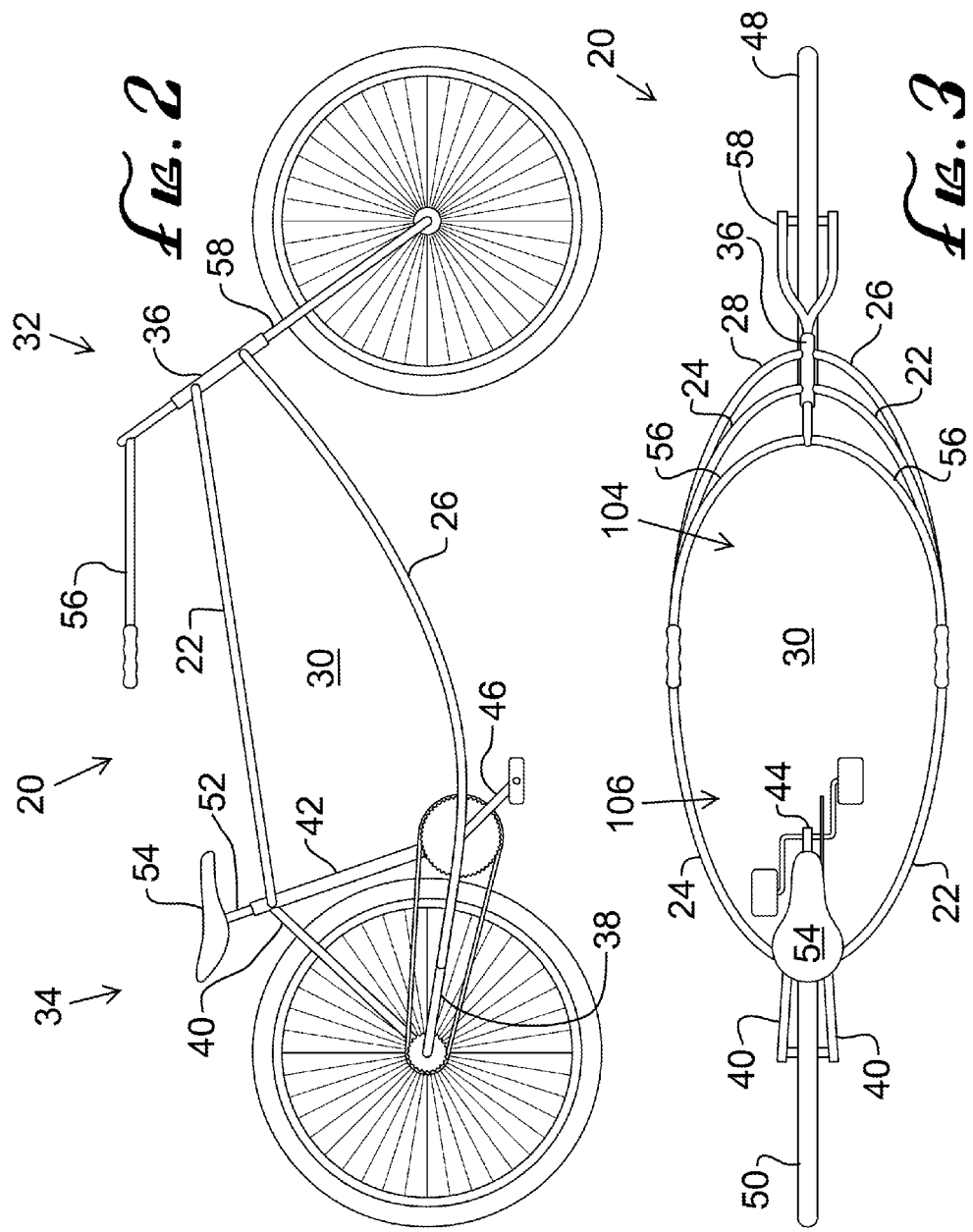

BICYCLE FOR RIDING AND WALKING

BACKGROUND

The present invention relates to a bicycle or other cycle, and more particularly, to a bicycle which facilitates riding and walking.

With current bicycle designs, if the user desires to walk with the bicycle instead of riding the bicycle, the user must walk beside the bicycle. The user may choose to walk because he is on a sidewalk, in a crowded area, or simply prefers to walk for part of the journey. The user must walk next to the bicycle while leaning slightly towards the bicycle to grasp the handlebars or other part of the bicycle for pushing the bicycle along. This arrangement can be uncomfortable, off-balance, and may result in injury due to kicking the pedals with the closest shin. Therefore, what is needed is a bicycle that facilitates an easy transition between riding and walking, without the user needing to walk alongside the bicycle.

SUMMARY

The present frame and cycle provides a convenient means for permitting the user to selectively ride or walk a bicycle without walking alongside. An example frame comprises a front portion with a head tube for supporting a stem of a handlebar and a front wheel fork, a back portion of the frame with a seat tube for supporting a seat post and a seat, a chain stay and a seat stay for cooperatively supporting a rear wheel, and a first tube and a second tube. The first tube connects the front portion to the back portion; and the second tube also connects the front portion to the back portion. The first tube is spaced apart in the lateral direction from the second tube to form an enclosure for surrounding the person walking or standing therein.

A longitudinal axis is defined from the front portion to the back portion; and a lateral axis is defined as being perpendicular to the longitudinal axis and parallel to level ground. In a first position the person sits on the seat with the pair of legs situated between the first tube and the second tube. In a second position the person's feet are supported by the ground for walking or standing; and the person is situated upright between the first tube and the second tube.

As an option, the first tube is bent in the lateral direction away from the second tube; and the second tube is bent in the lateral direction away from the first tube. Optionally, the first tube is a first top tube and the second tube is s second top tube. Again optionally, the frame can further have a third tube and a fourth tube. The third tube is located beneath the first tube and connects the front portion to the back portion. The fourth tube is located beneath the second tube and connects the front portion to the back portion. The third tube is spaced apart in the lateral direction from the fourth tube to further define the enclosure for surrounding the person walking or standing therein. Optionally, the third tube may be a third down tube (or first down tube) and the fourth tube may be a fourth down tube (or second down tube). Once again, as an option, a bottom bracket may be located at a base of the seat tube and between the third tube and the fourth tube, where the bottom bracket supports the crank assembly.

BRIEF DESCRIPTION OF THE SEVERAL VIEWS OF THE DRAWINGS

FIG. 2 is a side plan view of the embodiment of FIG. 1;

FIG. 3 is a top plan view of the of the embodiment of FIG. 1; and

Figure 1:
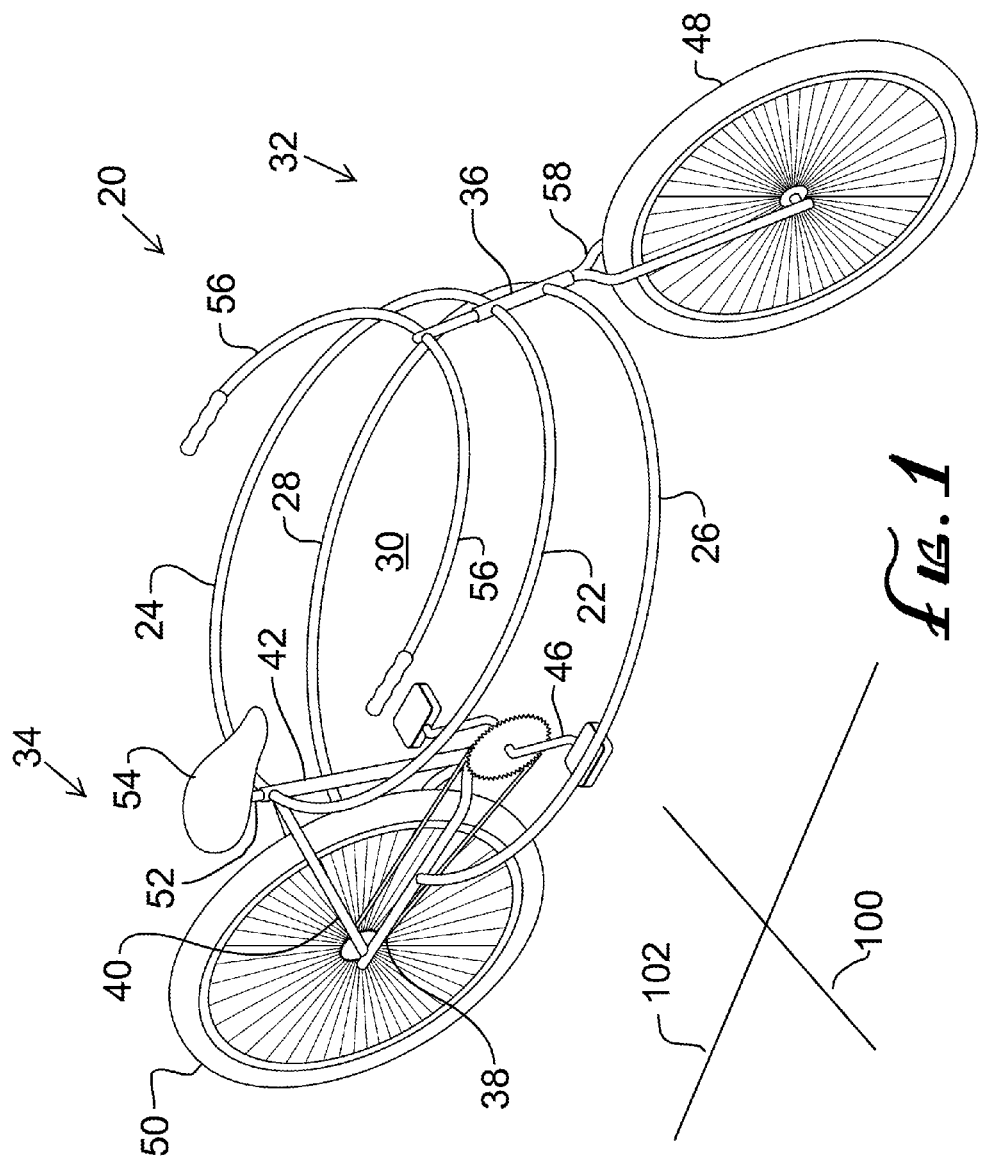
FIG. 1 is a top perspective view of the preferred embodiment of the present cycle, showing the top tubes and down tubes forming an enclosure.

LISTING OF REFERENCE NUMERALS OF FIRST-PREFERRED EMBODIMENT cycle or bicycle 20
first top tube 22
second top tube 24
first down tube 26
second down tube 28
enclosure 30
front portion 32
back portion 34
head tube 36
chain stay 38
seat stay 40
seat tube 42
bottom bracket 44
pedals 46
front wheel 48
back wheel 50
seat post 52
seat or saddle 54
handle bar 56
fork 58
lateral axis 100
longitudinal axis 102
forward enclosure portion 104
rear enclosure portion 106
person 200

DESCRIPTION OF THE PREFERRED EMBODIMENTS

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

FIGS. 1-4 illustrate an example embodiment of the present frame or cycle (20). The example embodiment shows a bicycle, however the present design may also apply to other forms of cycles. The present bicycle (20) has a front portion (32) connected to a back portion (34) by a series of tubes or other frame members. In particular, a first top tube (22) extends between the head tube (36) and the seat tube (42). And, a second top tube (22) also extends between the head tube (36) and the seat tube (42). The first top tube (22) is spaced apart in the lateral direction (100) from the second top tube (24). The spacing may vary, but should be sufficiently wide to accommodate the average user's hip width. This lateral spacing may vary approximately from one to three feet, and may be as wide as four feet. As can be seen in the illustration, the first top tube (22) is bent outwardly and away from the second top tube; and the second top tube (24) is likewise bent away from the first top tube (22). Although the example bends are shown as being arc-shaped, the tubes (22, 24) could each be bent in various configurations, including a square-like or triangle-like configuration, or any other configuration which creates an enclosure (30) that permits the user to walk or stand between the first top tube (22) and the second top tube (24) within the enclosure (30).

In existing bicycles, the top tube travels relatively straightly between the head tube and the seat tube. In the present frame (20), the area directly between the head tube (36) and the seat tube (42) is clear of any framework due to the outward bending of the top tubes (22, 24) to create a clear area of the enclosure (30).

To increase the strength of the frame (20), a first down tube (26) and a second down tube (28) can be provided, each located below the top tubes (22, 24), and extending to connect the head tube (36) to the seat tube (42) or the chain stay (38). In fact, although the top tubes (22, 24) and the down tubes (26, 28) are illustrated as being connected to particular portions of the frame (20), it is only necessary that the top tubes (22, 24) and the down tubes (26, 28) connect the front portion (32) to the back portion (34) of the frame (20). For example, either set of tubes (22, 24 or 26, 28) may connect with the seat stay. If the user desires to stand on a portion of the frame (20) while gliding forward under momentum, foot supports (not shown) may be welded or fastened to each of the down tubes (26, 28), such as plates, pegs, or other structure that can support the user in a standing position while the bicycle is moving.

Looking at FIG. 3, the enclosure (30) is shown from the top, and illustrates that the user (200) has ample room to walk or stand within the enclosure without undue interference with the frame (20). The pedals (46) are mounted to the bottom bracket (44), and protrude into the rear enclosure portion (104) to permit the user (200) to pedal while his legs are within the enclosure (30) and he is seated on the saddle (54). When the user (200) wants to walk or stand, he dismounts to the ground with his legs within the forward enclosure portion (104), where there is ample room to walk. The handle bars (56) are preferably as wide as the enclosure (30), but may be any width that does not severely interfere with walking or riding. Further, the handle bars extend rearwardly (towards the saddle) with a length which permit the user to comfortably hold the handle bars (56) while seated, yet comfortable hold the handle bars (56) while walking.

To enter the enclosure (30), the user (200) rests the bicycle (20) with the front wheel (48) and the rear wheel (50) on the ground, then tilts the bicycle (20) to one side, climbing in the enclosure from the lower or tilted side. Further, the frame (20) may be constructed with a gate-like opening, where at least one tube member, for example a portion of the first top tube (22) may swing up or out to permit the user to enter the enclosure. Although not shown, in this example, the gate portion of the tube can be hinged at one end and have a sliding coupling sleeve to strengthen the open end.

Figure 4:
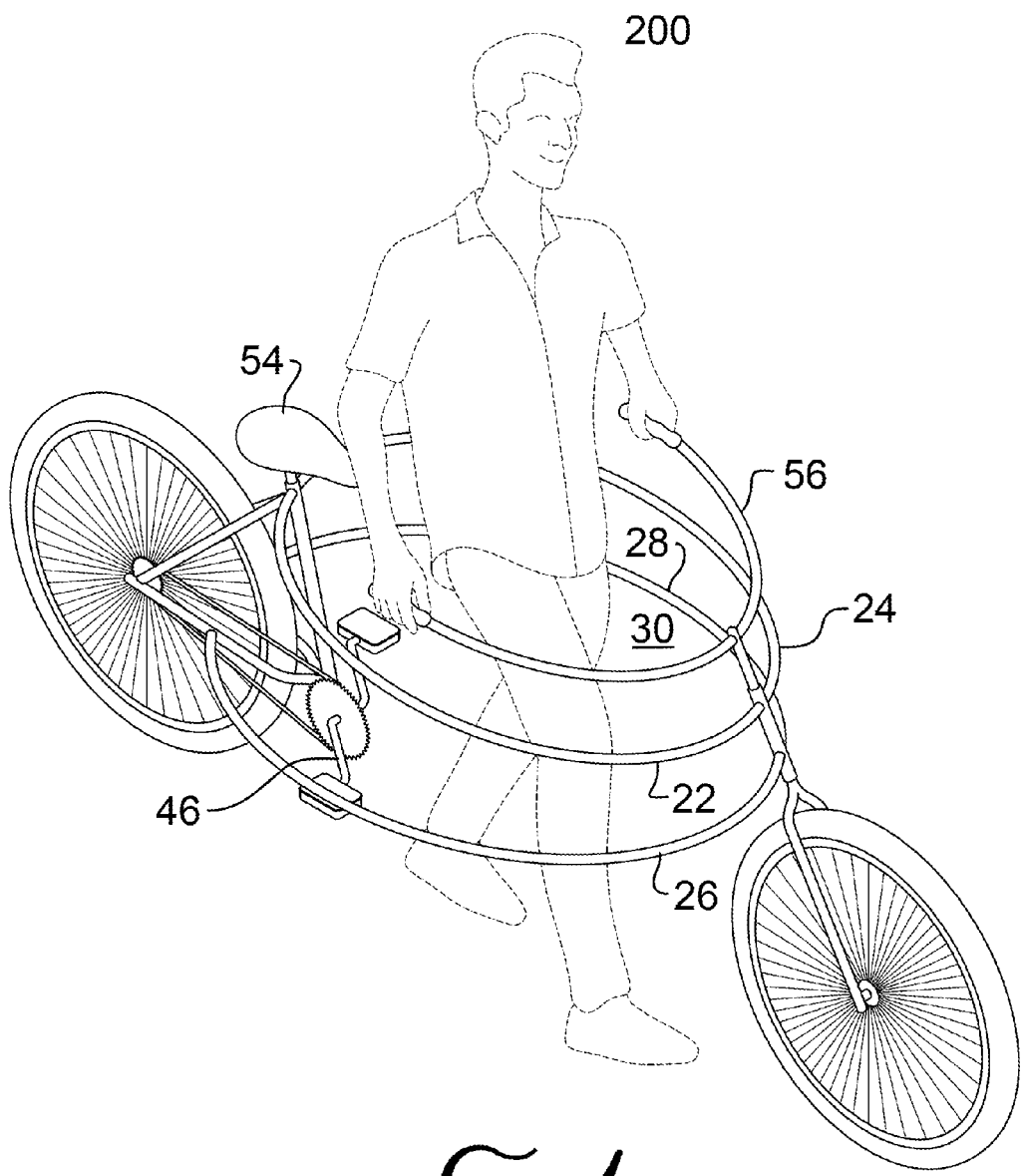
FIG. 4 is a top perspective view of the embodiment of FIG. 1, showing a person within the enclosure and walking the bicycle.

FIG. 4 illustrates a user (200) walking with the present bicycle (20), where the user's hip and legs are approximately in between the first top tube (22) and the second top tube (24) and in between the first down tube (26) and the second down tube (28). In this way, the user (200 may comfortably hold the bicycle (20) while walking, without leaning himself or the bicycle to one side and without bumping into the bicycle.

While particular forms of the invention have been illustrated and described, it will also be apparent to those skilled in the art that various modifications can be made without departing from the spirit and scope of the invention. Accordingly, it is not intended that the invention be limited except by the claims.

What is claimed is:

1. A frame for a cycle for a person having a pair of legs with feet, the frame comprising:
    a front portion of the frame with a head tube for supporting a stem of a handlebar and a front wheel fork;
    a back portion of the frame with a seat tube for supporting a seat post and a seat, a chain stay and a seat stay for cooperatively supporting a rear wheel, a longitudinal axis being defined from the front portion to the back portion and a lateral axis being defined as being perpendicular to the longitudinal axis and parallel to level ground; and
    a first tube and a second tube, the first tube connecting the front portion to the back portion, the second tube connecting the front portion to the back portion, the first tube spaced apart in the lateral direction from the second tube to form an enclosure for surrounding the person walking or standing therein;
    wherein in a first position the person sits on the seat with the pair of legs situated between the first tube and the second tube;
    and wherein in a second position the person's feet are supported by the ground for walking or standing, and the person is situated upright between the first tube and the second tube.

2. The frame of claim 1 wherein the first tube is bent in the lateral direction away from the second tube, and the second tube is bent in the lateral direction away from the first tube.

3. The frame of claim 1 wherein the first tube is a first top tube and the second tube is a second top tube.

4. The frame of claim 1 further comprising a third tube and a fourth tube, the third tube located beneath the first tube and connecting the front portion to the back portion, the fourth tube located beneath the second tube and connecting the front portion to the back portion, the third tube spaced apart in the lateral direction from the fourth tube to further define the enclosure for surrounding the person walking or standing therein.

5. The frame of claim 4 wherein a bottom bracket is located at a base of the seat tube and between the third tube and the fourth tube, the bottom bracket supporting the crank assembly.

6. The frame of claim 4 wherein the third tube is a third down tube and the fourth tube is a fourth down tube.

7. A bicycle for a person having a pair of legs with feet, the frame comprising:
    a front portion with a head tube for supporting a stem of a handlebar and a front wheel fork;
    a back portion with a seat tube for supporting a seat post and a seat, a chain stay and a seat stay for cooperatively supporting a rear wheel, a longitudinal axis being defined from the front portion to the back portion and a lateral axis being defined as being perpendicular to the longitudinal axis and parallel to level ground;
    a first top tube and a second top tube, the first top tube connecting the front portion to the back portion, the second top tube connecting the front portion to the back portion, the first top tube spaced apart in the lateral direction from the second top tube to form an enclosure for surrounding the person walking or standing therein; and
    a first down tube and a second down tube, the first down tube located beneath the first top tube and connecting the front portion to the back portion, the second down tube located beneath the second top tube and connecting the front portion to the back portion, the first down tube spaced apart in the lateral direction from the second down tube to further define the enclosure for surrounding the person walking or standing therein;

wherein in a first position the person sits on the seat with the pair of legs situated between the first top tube and the second top tube;

and wherein in a second position the person's feet are supported by the ground for walking or standing, and the person is situated upright between the first top tube and the second top tube.

8. The frame of claim 7 wherein a bottom bracket is located at a base of the seat tube and between the first down tube and the second down tube, the bottom bracket supporting the crank assembly.

9. The frame of claim 7 wherein the first top tube is bent in the lateral direction away from the second top tube, and the second top tube is bent in the lateral direction away from the first top tube.

10. The frame of claim 9 wherein the first down tube is bent in the lateral direction away from the second down tube, and the second down tube is bent in the lateral direction away from the first down tube.

\* \* \* \* \*